Oct. 7, 1947. W. W. KELLY 2,428,370
CHERRY FEEDING AND ORIENTING APPARATUS
Filed July 24, 1945 4 Sheets-Sheet 1
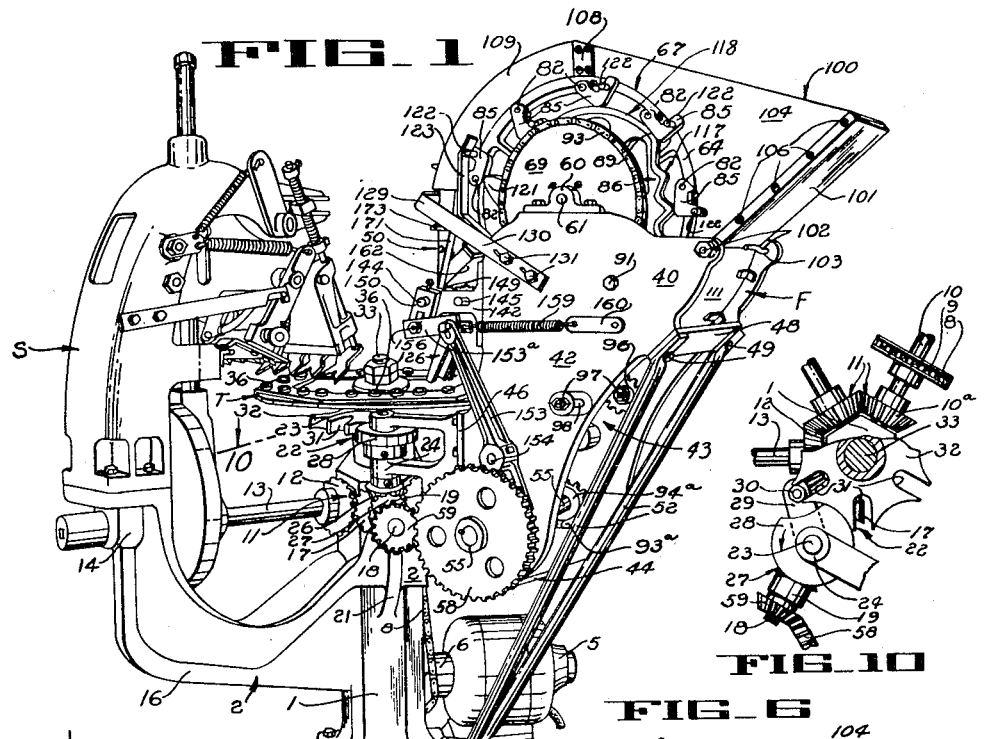
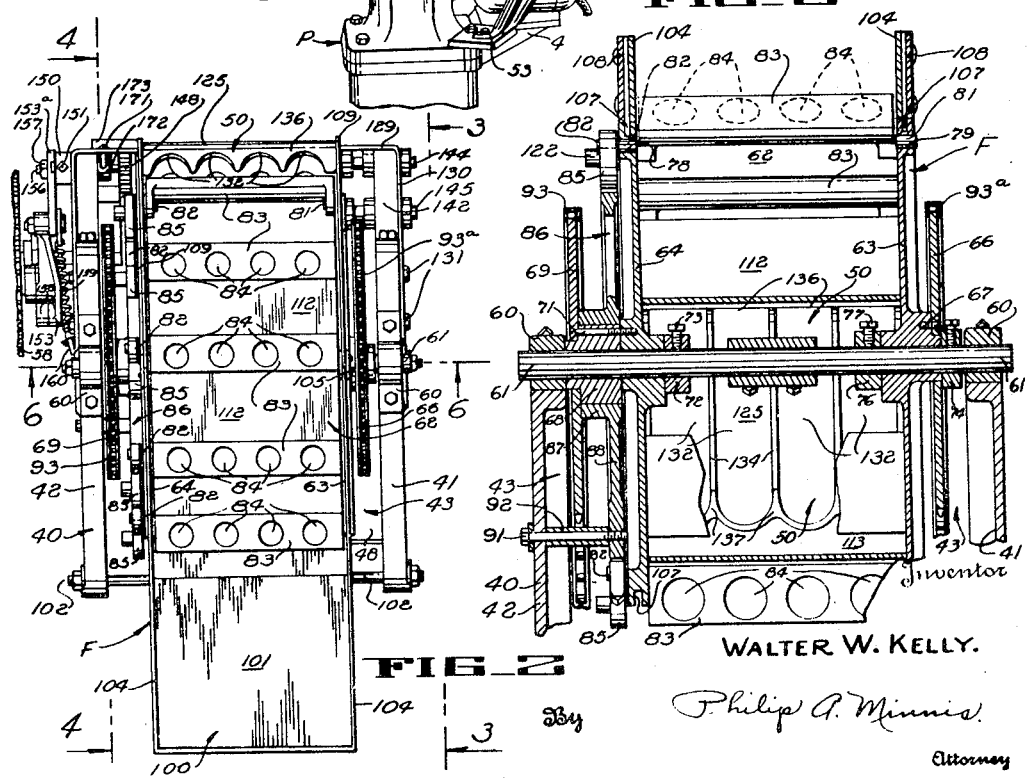
Inventor
WALTER W. KELLY.
By Philip A. Minnis
Attorney

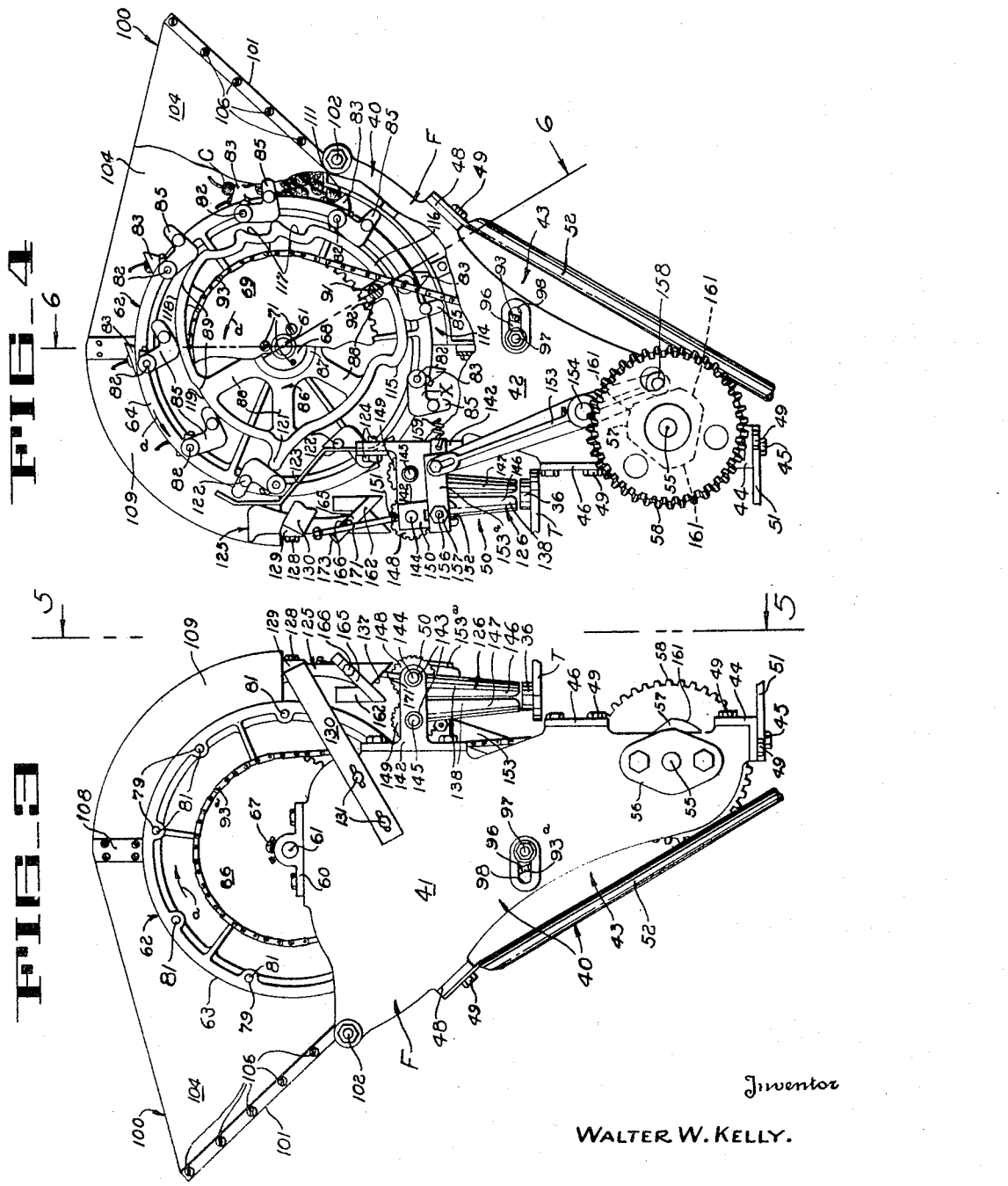

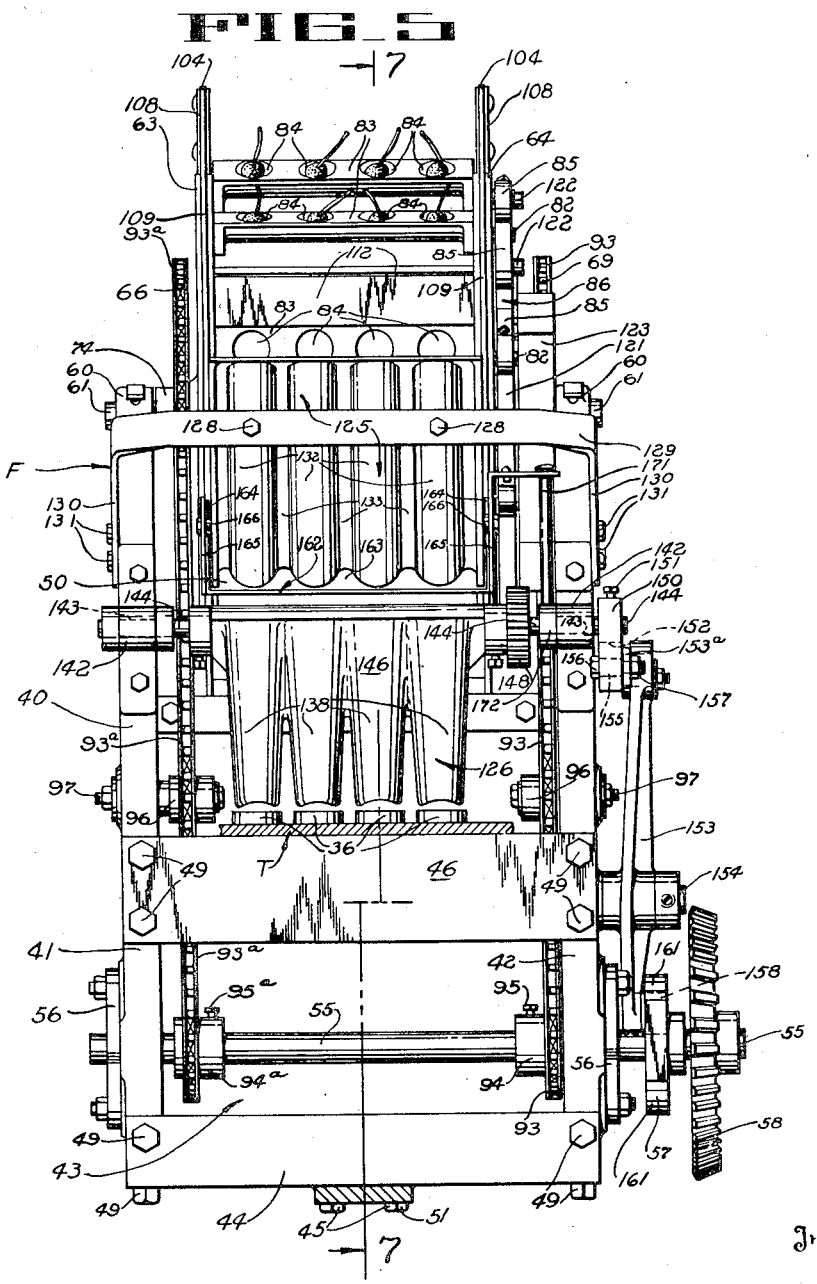

Oct. 7, 1947. W. W. KELLY 2,428,370
CHERRY FEEDING AND ORIENTING APPARATUS
Filed July 24, 1945 4 Sheets-Sheet 4
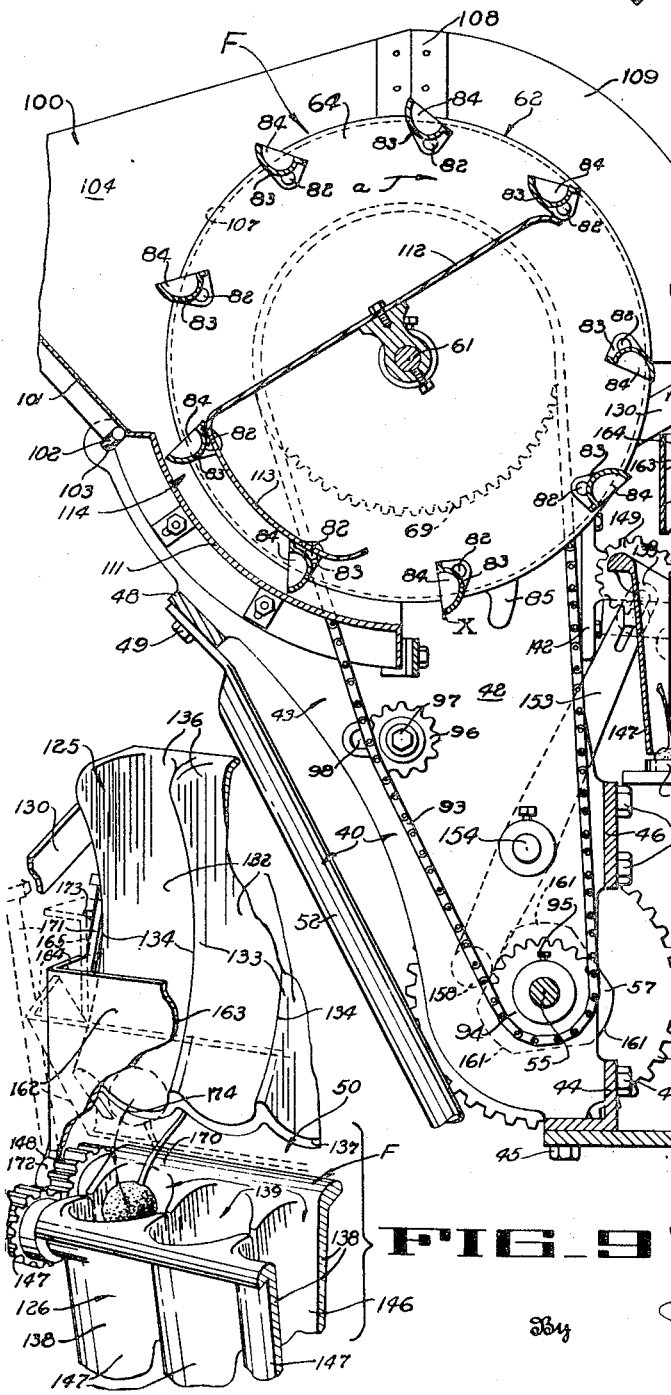
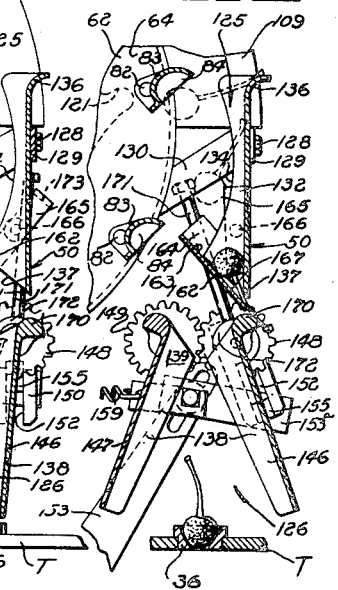
Inventor
WALTER W. KELLY.
By Philip G. Minnis
Attorney Patented Oct. 7, 1947

2,428,370

UNITED STATES PATENT OFFICE 2,428,370

CHERRY FEEDING AND ORIENTING APPARATUS

Walter W. Kelly, Portland, Oreg., assignor to Food Machinery Corporation, San Jose, Calif., a corporation of Delaware Application July 24, 1945, Serial No. 606,838

13 Claims. (Cl. 198—33)

The present invention relates to fruit feeding and orienting apparatus for feeding fruit such as cherries in oriented position to the fruit holder of a fruit preparation machine.

One object of the present invention is to provide a feed mechanism for automatically feeding cherries from a promiscuous mass thereof to a fruit supporting means of a fruit processing machine.

Another object is to provide an automatic feeding and orienting mechanism for righting stem bearing cherries and for feeding them in righted position to fruit holding and supporting means.

Another object is to provide an orienting mechanism for orienting cherries with their stems disposed in trailing position during their conveyance to the fruit holding means of a processing machine and for maintaining the cherries in said oriented position during their deposit into the fruit holding means.

Another object is to provide an apparatus for transferring oriented cherries to an intermittently movable fruit support and for permitting movement of the fruit support with the oriented cherries received thereby without disturbing the oriented position of the fruit relative thereto.

Another object is to provide a cherry feeding and orienting device wherein the free fall of the fruit is intercepted for timing the feeding thereof and for disposing cherries falling stem end down with their stem ends in trailing position upon release of the cherries for continued descent into the fruit holding means of a processing machine.

Other objects and advantages of the present invention will become apparent from the following description and drawings in which:

Fig. 1 is a perspective view of a fruit handling machine embodying the improved feeding and orienting apparatus of the present invention.

Fig. 2 is a plan view of the feeding and orienting apparatus.

Fig. 3 is a side elevation of the feeding and orienting apparatus as seen from line 3—3 in Fig. 2.

Fig. 4 is a side elevation partly in section taken along line 4—4 in Fig. 2, certain parts being broken away.

Fig. 5 is a rear view of the feeding and orienting apparatus as seen from line 5—5 in Fig. 3.

Fig. 6 is a fragmentary vertical section, partly in elevation, taken along line 6—6 in Figs. 2 and 4.

Fig. 7 is a vertical section taken along line 7—7 in Fig. 5.

Fig. 8 is a fragmentary section of a portion of the feeding and orienting mechanism of Fig. 7 and illustrating the same in a different position.

Fig. 9 is a fragmentary perspective view of the fruit righting mechanism as seen from the left in Fig. 7.

Fig. 10 is a fragmentary detail of a drive mechanism of the present invention taken along line 10 in Fig. 1 and at slightly larger scale with respect thereto.

The present invention is directed to improvements in fruit handling machines of the type generally shown in U. S. Letters Patent No. 2,375,350 issued to Burton C. Coons, May 8, 1945.

In general, the fruit handling machine in connection with which the feeding and orienting apparatus of the present invention has been illustrated, comprises a pedestal P on which is arranged a turret T adapted to receive the cherries in proper position from a feed mechanism F for conveyance to a stemming mechanism S, as well as other fruit treating and processing mechanism not herein shown. The present invention is embodied in the automatic feed mechanism F and therefore only so much of the fruit handling machine will be described as to give a clear understanding of the invention.

The pedestal P (Fig. 1) comprises a hexagonal body portion 1 provided with a plurality of spider arms 2 extending radially therefrom. The base of the pedestal is provided with a bracket 4 upon which a motor 5 having a speed reduction unit 6 is mounted for driving a sprocket 7. A drive chain 8 is trained around the sprocket 7 and a similar and driven sprocket 9 associated with a drive shaft 10 (Fig. 10) arranged between the head of the hexagonal body portion and one of the radially extending spider arms. Keyed to the drive shaft 10 is a bevel gear 10a forming a part of a train of bevel gears generally indicated at 11 arranged on separate shafts around the hexagonal body portion so that the train of gears 11 will be driven by the motor 5 in a manner well known in the art.

One of the bevel gears 12 of the train of bevel gears 11 is fixed to a drive shaft 13 supported between the pedestal and a bearing boss 14 of the spider arm 16 for driving the stemming mechanism S. Another bevel gear 17 of the train 11 is secured to a drive shaft 18 extending between the pedestal and a bearing boss 19 of the spider arm 21 and this bevel gear is enmeshed with the bevel gear 12.

A Geneva drive 22 is provided for indexing the turret T relative to the automatic feed mechanism F. This Geneva drive includes a shaft 23 supported in spaced bearings 24 of the upper portion of the spider arm 21 to dispose the shaft 23 in a vertical plane above the shaft 18.

The lower end of the vertical shaft 23 has a bevel gear 26 secured thereto for rotation therewith, and this bevel gear is enmeshed with a bevel gear 27 keyed to the drive shaft 18.

A disc 28 is secured to the vertical shaft 23 and has associated therewith an arm 29 carrying an eccentrically mounted roller 30 adapted to enter cam slots 31 formed radially in a star wheel 32 secured to the underside of the turret T, the turret being rotatably mounted on a stud shaft 33 extending upwardly from the hexagonal body portion of the pedestal. Upon operation of the motor 5 the train of gears 11 is set in motion to rotate the vertical shaft 23, the disc 28 and the eccentric roller 30 so that the latter enters a slot 31 of the star wheel to intermittently rotate the turret in a well known manner. By this arrangement the turret is indexed relative to the various fruit treating mechanisms arranged adjacent its periphery.

The turret T carries a plurality of fruit supporting cups 36 arranged in groups, each group being aligned on a different chord line of the turret so that when the turret is indexed, a chordal group of cups 36 will be positioned under the feed mechanism F to receive cherries therefrom for advancing them upon successive intermittent operations of the Geneva drive 22 into the indexed positions under the various fruit treating mechanisms around the turret, for example, the stemming mechanism S.

The feed mechanism F (Figs. 1, 2, 3 and 7) has a frame 40 comprising a pair of bracket plates 41 and 42 spaced from each other to form a housing 43 joined at its lower end by an angle 44, at its midsection adjacent the turret T by a plate 46, and at its upper outer end by a cross plate 48, each of which is secured to milled portions of the respective bracket plates by bolts 49.

The angle 44 (Fig. 7) rests on a spider arm 51 extending radially from the pedestal P and is secured thereto by bolts 45. A pair of struts 52 have their upper ends secured to the cross plate 48 by the bolts 49 and their lower ends bolted at 53 to the base of the pedestal P. The frame 40 is thus arranged in such a manner relative to the pedestal P as to position an orienting unit 50 of the feed mechanism F directly above a chordal group of fruit supporting cups 36 on the turret T when the latter is in one of its indexed positions (Figs. 3, 4 and 5).

The feed mechanism F (Figs. 1, 3, 4, 5 and 7) has a main drive shaft 55 journalled in bearings 56 arranged at the lower ends of the brackets 41 and 42. As shown in Fig. 5 one end of the main drive shaft 55 extends beyond the outer face of the bracket plate 42 and carries a feed chute operating cam 57, later to be explained, and a drive gear 58, positioned in driving connection with a pinion gear 59 (Figs. 1 and 10) keyed to the outer extremity of the shaft 18 by which the turret indexing mechanism is operated. This arrangement provides a common drive for the feed mechanism F and the turret T so that they are operated in timed relation with respect to each other.

The upper end of each of the bracket plates 41 and 42 (Figs. 1 and 2) is provided with a bearing or boss 60. Mounted within the bearings 60 and fixed against rotation relative thereto is a stationary shaft 61 extending transversely the housing 43. Disposed within the housing 43 and mounted on the shaft 61 for rotation thereon is a feed reel 62.

The feed reel 62 (Figs. 2, 5 and 6) comprises discs 63 and 64, the hub portions of which are rotatably mounted on the fixed shaft 61. As best seen in Fig. 6 a sprocket wheel 66 is secured by screws 67 to the hub portion of the disc 63 for rotation therewith about the shaft 61. Positioned upon the shaft 61 and secured to the opposite disc 64 is a bushing 68 carrying a sprocket wheel 69 at its outer end. The sprocket 69 and bushing 68 are secured to the hub of the disc 64 by machine screws 71.

The bushing 68 is arranged in contact with the boss 60 on the bracket plate 42 and is so held by a collar 72 secured to the shaft 61 by a set screw 73. A like collar 74 is secured on the shaft 61 adjacent the boss 60 on the bracket plate 41 and a collar 76 secured to the shaft 61 by a set screw 77 bears against the inner side of the disc 63 so that the discs are maintained in properly spaced relation on the shaft 61.

The discs 63 and 64 (Fig. 6) have a plurality of holes 79 and 78, respectively, equally spaced from each other along the rim portions of the discs. The holes of opposing discs are transversely aligned to receive spindle shanks 81 and 82 formed in the ends of cup bars 83 having fruit receiving pockets 84 formed therein at equally spaced lateral points between the discs 63 and 64.

The spindle shanks 82 on each of these cup bars extend through their respective holes 78 in the disc 64 and carry a weighted arm 85 normally tending to balance the cup bars relative to the reel as shown in position X in Fig. 4.

A cup bar cam 86 (Figs. 4 and 6) is arranged co-axially with the disc 64 for actuating the arms 85 and the cup bars associated therewith. This cup bar cam has a hub portion 87 arranged on the bushing 68 secured to the rotatable disc 64 and has a plurality of spokes 88 formed integrally therewith which terminate in an irregularly shaped annular cam track 89. An anchor bolt 91 (Fig. 6) extends through a hole in the bracket plate 42 and through a spacer sleeve 92 and is threaded into a threaded opening formed in one of the spokes 88 to mount the cam 86 in fixed position on the frame 40.

A drive chain 93 (Figs. 5 and 7) is trained around the sprocket 69 and a drive sprocket 94 secured by a set screw 95 to the main drive shaft 55. A similar drive chain 93a is trained around the sprocket 66 and a drive sprocket 94a secured by a set screw 95a to the main drive shaft 55. Each of these drive chains 93 and 93a are properly tensioned by separate idler sprockets 96 each of which is rotatably mounted on separate stud shafts 97 adjustable in slots 98 formed in the respective bracket plates 41 and 42. In this manner the reel 62 is constantly rotated in the direction of the arrows a (Figs. 3, 4 and 7) to transfer one cup bar to a point above a group of fruit supporting cups 36 in the interim of each intermittent operation of the turret T by the Geneva drive 22.

A hopper 100 is arranged on the frame 40 to receive and support a promiscuous mass of cherries. The hopper 100 includes a chute portion 101 having pins 102 extending laterally from its lower ends to fit into mounting holes 103 formed in the upper corners of the bracket plates 41 and 42. The hopper has side walls 104 suitably secured to the chute by screws 106 and these side walls extend toward the reel 62 to fit into annular grooves 107 (Fig. 6) formed in the periphery of the two discs 63 and 64. The walls 104 terminate at their upper ends above the vertical axis of the discs and secured to each wall as at 108 is a skirting 109 which forms a continuation of the side walls over the quarter segment of the discs adjacent the turret.

The lower ends of the walls 104 terminate below the discs and have an arcuate pan 111 secured thereto which extends transversely of the housing. The upper end of the pan 111 is joined to the lower edge of the chute 101, and the pan is spaced from the reel sufficiently to allow the cup bars to travel pocket side exposed upwardly along the pan to pick up fruit supported in the hopper.

An inclined return chute 112 (Fig. 7) is supported on the reel shaft 61 between the discs 63 and 64 and is positioned to direct falling cherries back toward the lower edge of the chute 101. This return chute has its upper edge positioned substantially midway between the vertical axis of the reel and the turret side of its periphery and its lower edge in spaced relation with respect to the lower edge of the chute 101 to permit the cup bars to pass between the lower terminals of the two chutes. An arcuate section 113 extends from the lower end of the return chute and is spaced from the arcuate pan 111 to cooperate therewith in forming an arcuate passage 114 through which all cup bars must pass as they ascend from position X toward the lower edge of the hopper 100. The passage thus formed confines cherries dropping from the hopper in the path of the ascending cup bars and prevents loss of fruit at the lower end of the chute 101.

As shown in Fig. 4 the fruit gravitates toward the lower end of the chute 101 and the empty cup bars move in succession from position X along the arcuate pan 111, the weighted arms 85 first engaging a cam edge 115 of the cam track 89 and then riding a high segmental arc 116 thereof as the cup bars approach the lower end of the chute 101.

As a cup bar ascends through the mass of cherries at the bottom of the hopper, each pocket 84 will receive a cherry and occasionally additional cherries (such as the one indicated at C in Fig. 4) may become lodged on the bar. However, during ascent of the cup bar through the mass of cherries, the weighted arm engages an undulated portion 117 of the cam track 89 and as it rides into and out of each undulation on the track a rocking motion is imparted to the bar to shake any cherries in excess of those lodged in the pockets 84 from the cup bars, the cherries thus jarred off of the cup bars falling back into the hopper.

As the cup bars move away from the undulated portion 117 of the cam track 89 the weighted arms ride onto a descending cam portion 118 whereby the cup bars are tilted slightly forward until they pass the upper vertical axis of the reel. In this manner any cherries not jarred off of the cup bar when the weighted arm is actuated by the undulated cam portion will be caused to roll from the bar toward the turret side thereof and will gravitate down the return chute 112. Thereafter the arm 85 rides over a low portion 119 of the cam track 89 to support the cup bar horizontally with the pockets thereof facing directly upward.

As a descending cup bar arrives at the horizontal axis of the reel the weighted arm engages a projection 121 (Fig. 4) on the cam track whereby the cup bar is tipped into an inverted position to discharge the cherries from the pockets thereof, the bar and arm turning completely over until a lateral pin 122 carried by the weighted arm engages a fixed cam bar 123 secured to the bracket plate 42 by bolts 124. The cup bar is thereby held in discharged position as it travels over the orienting unit 50 hereinbefore referred to. The fixed cam 123 terminates on the reel side of the orienting unit 50 to permit each cup bar and arm to again assume normal position as shown at X in Fig. 4 prior to their next cycle of operation.

The orienting unit 50 is arranged on the turret side of the housing 43 to receive the cherries discharged from the reel 62 and its purpose is to righten the cherries as they gravitate toward the turret so that each cherry will be positioned, stem end up, as it is directed to its respective fruit supporting cup 36.

As best seen in Fig. 5 the orienting unit 50 includes a stem guide unit 125 and a feed chute unit 126. The stem guide unit 125 is secured by bolts 128 to a U-shaped bracket 129 which, in turn, has its legs 130 secured by bolts 131 (Fig. 5) to the respective sides of the frame 40.

The stem guide unit 125 comprises a plurality of vertically arranged semi-tubular deflectors 132 divided by their contiguous side walls 133 which form arcuate edges 134 adjacent the reel 62. The upper ends 136 of the deflectors are flared outwardly (Figs. 7 and 8). While the lower ends 137 of the side walls 133 of the deflectors are cut off at an angle of approximately 45 degrees.

The feed chute unit 126 comprises a plurality of open ended frusto conical feed chutes 138, each having a widened mouth 139 for receiving the descending cherries and for engaging laterally disposed stems thereof to direct the fruit stem end up into the fruit supporting cups 36. The lower end of the feed chutes 138 are of sufficient diameter to permit the largest cherries to gravitate into the fruit supporting cups while at the same time centering the fruit relative thereto. The entire feed chute unit 126 is split transversely into two separate sections for reasons later to become apparent and the semi-tubular deflectors 132 and chutes 138 are disposed in vertical alignment with each other and the pocket 84 and cups 36 as best seen in Fig. 5.

A pair of brackets 142 (Figs. 3, 4 and 5) are bolted on the forward edges of the respective bracket plates 41 and 42 and have a pair of spaced bearings 143 formed therein to receive spindles 144 and 145 extending laterally from the front and rear halves 146 and 147, respectively, of the feed chute unit 126 to support the two halves for movement toward and away from each other. As best seen in Figs. 7, 8 and 9 the front and rear halves of the feed chute unit are linked together for unitary movement by spur gears 148 and 149 keyed to the spindles 144 and 145, respectively, at one side of the orienting unit 50.

The spindle 144 (Fig. 4) has a lever arm 150 secured thereto by a set screw 151 and this lever arm has a slot 152 formed therein. A rocker arm 153 is pivotally mounted on a stud shaft 154 extending outwardly from the bracket plate 42. The upper end of this rocker arm has an offset portion 153a positioned adjacent the lever arm 150. Arranged in the slot 152 is a swivel block 155 (Fig. 5) mounted for rotation on a shouldered stud bolt 156, the threaded end of which extends through a hole in the end of the offset portion 153a to receive a lock nut 157 whereby the stud bolt is secured to the offset portion. The lower end of the rocker arm carries a cam roller 158 which engages the periphery of the feed chute operating cam 57 hereinbefore mentioned for opening and closing the feed chute in timed relation with the operation of the feed reel 62 and the turret T.

The two halves of the feed chute unit are normally urged into closed position as seen in Fig. 4 by a tension spring 159 having one end hooked to the upper end of the rocker arm 153 and its opposite end anchored as at 160 to the side wall of the bracket plate 42 (Fig. 1).

The feed chute operating cam is rotated constantly with the main drive shaft 55 and is therefore operated in timed relation with the turret T as well as the feed reel 62. A plurality of raised portions 161 (Fig. 4) are formed on the cam 57 and as the latter rotates the raised portions successively engage the roller 158 to alternately rock the rocker arm 153 from the position shown in Fig. 7 to the position shown in Fig. 8 once upon each indexing of the turret T by the Geneva drive 22. In this manner the swivel block 155 on the offset portion of the rocker arm alternately rocks the slotted lever arm 150 back and forth to oscillate the spindle 144 and front half 146 of the feed chute unit 126. The rear half 147 of the feed chute unit is simultaneously oscillated by the spur gears 148 and 149 thereby opening and closing the frusto conical feed chutes 138 in timed relation with the intermittent movement of the turret T. The feed chutes are closed when the turret is at rest and open just prior to its movement to permit each group of fruit supporting cups 36 with the fruit deposited therein to pass on to the next indexed position without disturbing the upwardly extending stems of the fruit.

It will be noted that the cherries are discharged from the cup bars while the feed chutes 138 are open. However, the fall of the fruit is arrested prior to its entrance into the mouth of the feed chute unit by a timing gate 162. This gate comprises an elongated plate 163 extending across the orienting unit in the space provided between the angular lower end 137 of the side walls 133 of the stem guide unit 125 and the upper end of the feed chute unit 126. The plate 163 has bent up ends 164 to which arms 165 disposed diagonally relative to the plate are secured. The gate is pivotally mounted on bolts 166 extending from the sides of the stem guide unit 125 and through the mounting arms 165 and normally tends to gravitate toward the angularly disposed lower ends 137 of the side walls 133 of the stem guide. The pivot point of the gate is so positioned as to cause the plate 163 to engage the lower ends 137 adjacent the side walls 133 of the stem guide when the gate is in closed position. When so positioned the gate 162 and the stem guide unit 125 form a V-shaped trough 167 open at its apex to support the cherries above the feed chute unit 126 when the latter is in opened condition. By this arrangement the stems of any fruit descending from the cup bars, stem end first, will strike the angularly disposed plate 163 and the stems will be directed through the open bottom at the apex of the trough 167 and will lie upon the upper edge 170 of the front half 146 of the feed chute unit 126 while the drupe portion of the fruit is held between the gate and the stem guide as illustrated in full lines in Fig. 8 and dotted lines in Fig. 9.

Associated with the gate 162 (Figs. 4, 5 and 7) is an actuating mechanism which comprises an arm 171 extending radially from the spindle 144. The arm 171 is threaded into a collar 172 arranged on the spindle 144, and the lower end of the arm is tightly threaded against the spindle to secure the collar 172 and arm 171 in proper position on the spindle. The outer end of the arm 171 is adapted to bear against a laterally bent portion 173 of the mounting arm 165 of the gate. The arrangement is such that when the rocker arm 153 is urged back into normal position by the spring 159 to close the feed chute unit 126, the arm 171 is rocked counter-clockwise (Fig. 4) against the bent portion 173 to swing the plate 163 into a vertical position thus discharging the fruit held thereby into the mouth of the feed chute unit 126 as seen in Fig. 9.

Under the most ideal conditions the cherries picked up from the hopper will rest in the pockets 84 with their stems extending substantially perpendicular to the upper face of the cup bar 83 in which case the cherries upon being discharged from the reel will fall with their stems extending substantially radially with respect to the reel at their point of discharge therefrom. The cherries in their free fall from the cup bars will therefore be swung into a position with their stem ends up i. e. in trailing position, upon engagement of the stems of the fruit with the upper end 136 of the deflectors 132 of the stem guide unit 125 as shown in dotted lines in Fig. 8. Consequently, these cherries are deposited drupe end first and stem end up into the V-shaped pockets 167 formed by the stem guide unit 125 and gate 162 when the latter is in closed position.

When the cherries so positioned are discharged from the pockets upon opening of the gate they fall stem end up i. e. with their stems in trailing position into the frusto conical feed chutes 138 of the feed chute unit 126 which maintain the fruit in said oriented condition while delivering the fruit into the fruit supporting cups 36 on the turret T positioned therebeneath.

However, should any cherry fall from the pockets 84 stem end foremost the stem will be deflected by the plate 163 into and through the open bottom i. e. the apex of the trough 167 and will rest on the rounded upper edge 170 of the feed chute unit 126 while the drupe portion of such fruit will be supported in the trough as shown in full lines Fig. 8. When the feed chute unit is closed the arm 171 engages the bent portion 173 of the gate 162 to swing the same open i. e. into fruit releasing position as shown in Fig. 7 whereupon the cherry falling from full line position in Fig. 8 and in dotted line position in Fig. 9 will swing as indicated by the arrow 174 by the weight of its drupe portion of the cherry about its stem which is fulcrumed on the upper edge 170 of the feed chute unit, and thereupon the cherry will gravitate drupe portion first into the feed chutes 138 and discharge stem up therefrom into the fruit supporting cup 36 of the turret T as seen in full lines Fig. 7.

Cherries discharged from the cup bars with their stems extending to either one or the other side of the pocket 84 will be disposed so that their laterally extending stems engage the side walls 133 or the arcuate edges 134 thereof whereby the cherries are righted and enter the V-shaped pockets 167 stem end up.

Operation

In the foregoing description of the construction of the feed mechanism the operation of its various parts has been specifically explained. A résumé of the entire cycle of operation of the machine, however, will now be given to bring out the sequence of operation of the various units thereof.

Upon operation of the motor 5 the sprocket 7 is driven and through drive chain 8 the train of gears 11 is set in motion.

As the gear train 11 rotates, the shaft 18 is rotated counter-clockwise in Fig. 1 thus simultaneously driving the Geneva drive 22 as well as the main drive shaft 55 of the feed mechanism. The turret T is intermittently rotated about its spindle 33 and upon each intermittent movement will present a group of empty fruit supporting cups 36 beneath the feed chutes 138 in timed relation with each discharge of fruit from the feed mechanism. The main drive shaft 55 is constantly rotated and through sprockets 94 and 94a and drive chains 93 and 93a the reel 62 is likewise constantly rotated.

A lug box of cherries is then dumped into the hopper 100 and the promiscuous mass of cherries gravitates down the chute 101 and rests upon the lower edges of the chutes 101 and 112 across the passage 114 provided by the two arcuate portions 111 and 113.

As the reel 62 rotates clockwise in Fig. 7 the cup bars 83 beginning at position X enter the passage 114 pocket side up by reason of the weighted arms riding on the high arcuate portion 116 of the annular cam 89. The cup bars are then elevated toward the lower end of the hopper and as they enter the promiscuous mass of cherries the weighted arms ride into and out of the undulations on the cam 89 whereby the bars 83 are oscillated to agitate the cherries and ultimately pickup one cherry in each pocket 84 of the cup bar and to shake excess cherries off of the cup bar. Thereupon the weighted arms ride onto the descending cam portion 118 to tilt the cup bars forward and discharge any excess cherries toward the turret side of the reel onto the return chute 112 for return toward the lower end of the hopper 100.

The weighted arms then ride on the depression 119 of the cam 89 to cause the cup bars to assume a horizontal position for supporting the cherries in the pockets 84 as they approach the fruit discharging position above the fruit supporting cups 36 of the turret T.

As each cup bar arrives at a point adjacent the upper edge of the stem guide unit 125 the weighted arm 85 of such bar engages the projection 121 of the cam track whereupon the cup bar is swung on its spindle shanks 81 and 82 in the general direction of the rotation of the reel to cast the cherries in a tangential direction from the reel and at a slight angle with respect to vertical toward the gate 162 which is closed at this time while the feed chute unit 126 is in its open position as shown in Fig. 8.

As the cherries leave the pockets 84 their stems may be disposed in any angular direction relative to the drupe portion of the fruit, some cherries being oriented by reason of their stems engaging the flared upper end 136 of the stem guide unit 125; others being oriented by engagement of their stems with side walls 133 or the arcuate edge 134 thereof and consequent descent of their drupe portions into the valleys formed between the contiguous walls of each deflector 132; while still others may fall in such manner that their stems engage the upper edge of the plate 163 of the closed gate 162 thus causing the cherries to turn so as to enter stem up into the V-shaped trough 167.

Cherries falling from the feed reel under the foregoing conditions will be properly deposited upon the gate 162 for timed release, stem end up, into the feed chutes 138, any substantial deviation from vertical position of their stem blossom axes being corrected by the mouth rim 170 and conical walls of the chutes 138 which under such condition engage the stems of the cherries as the fruit drops into and through the feed chutes 138 for deposit stem end up into the cups 36 of the turret T therebeneath.

In addition to the cherries falling from the feed reel under the foregoing conditions a certain percentage of cherries will drop stem end first into trough 167. Due to the V-shaped configuration of the trough and especially the angular disposition of the plate 163 the stem of each cherry dropping stem end first is guided into the opening between the gate 162 and the stem guide unit 125 so that the stem projects therefrom and extends with its lower end through the open space intermediate the stem guide 125 and the upper end 170 of the front section 146 of the feed chute unit 126 as shown in full lines in Fig. 8 and in dotted lines in Fig. 9.

In this position the free end of the stem overlies the rounded upper edge 170 on the front half 146 of the feed chute unit 126 so that when the feed chute unit is closed and the gate 162 is opened to release the fruit the stem is held back and the drupe portion of the fruit swings around and drops into its respective chute 138 eventually dragging the stem over the rounded edge 170, whereby the fruit is oriented stem end up and is fed in this position to one of the fruit receiving cups 36 therebeneath.

In each of the foregoing instances it will be noted that the cherries descend with their stem ends trailing through the feed chute unit 126 for deposit in their respective fruit supporting cups 36 with their stems extending upwardly from the cups.

As next successive cup bar 83 approaches fruit discharging position adjacent the stem guide 125 the roller on the Geneva drive enters the next successive slot 31 on the star wheel 32 to advance the turret and dispose the next group of fruit receiving cups 36 below the feed chute unit 126. However, prior to the advancement of the turret T the raised portion 161 of the cam 57 engages the roller 158 on the rocker arm 153 and rocks the latter against the action of spring 159 whereby the two halves of the feed chute unit are swung to open position as seen in Fig. 8, and out of the path of travel of the stems of the fruit deposited into the group of cups 36 therebeneath.

While the feed chute unit 126 is opened the arm 171 is swung out of engagement with the portion 173 of the arm 165 and the gate 162 swings to closed position so that it intercepts the next group of cherries discharged from the next cup bar 83 of the feed reel during the continued operation of the same. Thereupon as the roller on the Geneva drive leaves the slot 31 of the star wheel above referred to the roller 158 on rocker arm 153 rides off of the raised portion 161 on the cam 57 and the rocker arm 153 returns to its original position as shown in full lines in Fig. 4 under the action of spring 159 whereby the feed chute unit 126 is closed and simultaneusly therewith the arm 171 engages the offset portion 173 and swings the gate 162 to open position as seen in Figs. 4 and 7 whereby the cherries held thereby are released and gravitate through the feed chutes 138 of the now closed feed chute unit 126 and are deposited stem end up, into the next group of fruit supporting cups 36 disposed therebeneath.

In this manner the foregoing cycle of operation repeats during the operation of the machine so as to feed a continuous flow of fruit to successive groups of fruit supporting cups 36.

While the foregoing description of the mechanism and its operation refers to a specific form of construction for carrying out the invention it is to be understood that various modifications thereof may be made without departing from spirit of the invention. I therefore desire to avail myself of all modifications and alterations coming within the scope of the accompanying claims.

What I claim as new and desire to protect by Letters Patent is:

1. A feeding and orienting apparatus for fruit handling machines having movable fruit holding means for receiving fruit stem end up, comprising a hopper for receiving a promiscuous mass of stem bearing fruit, a plurality of cup bars each having a fruit receiving pocket for picking up an individual fruit, means for supporting the cup bars for independent rotation and for moving them in succession from the hopper to a point above said fruit holding means, a cam engageable by a portion of each cup bar in the course of its movement through said hopper for holding the fruit receiving pockets thereof in fruit supporting position, said cam having undulations into and out of which said portion of each cup bar rides for imparting a rocking motion to the cup bar for jarring from the latter all fruit in excess of the individual fruit in the fruit receiving pocket therein, and means engageable by said portion of each cup bar for subsequently inverting the cup bars to discharge the fruit from said fruit receiving pockets at said point above said fruit holding means.

2. A feed mechanism comprising a frame, a hopper on the frame and adapted to receive a promiscuous mass of fruit, a shaft carried by the frame, a reel rotatably mounted on said shaft, a plurality of cup bars pivotally arranged at segmental points along the rim of said reel and having fruit receiving pockets therein, means for rotating said reel, weighted arms associated with said cup bars for balancing the latter in a predetermined position, a cam on the frame engageable by the weighted arms for holding the cup bars in a position to support an individual fruit in each of said pockets and having an undulated portion for oscillating the cup bars to jar excess fruit from said fruit receiving pockets while supporting an individual fruit therein, said cam having a portion engageable by said arms for rocking said cup bars into a position to discharge the fruit from said fruit receiving pockets.

3. In a feed mechanism for a fruit handling machine having a hopper for supporting a promiscuous mass of cherries, feed means arranged to receive cherries from said hopper for conveyance to a point of discharge, said feed means comprising a stationary shaft, a reel rotatably mounted on said shaft, a plurality of fruit receiving cups arranged at segmental points along the rim portion of said reel, weighted arms associated with said fruit receiving cups for balancing the latter in a predetermined position, a cam arranged adjacent said reel engageable by the weighted arms for actuating the latter and the cups into a position for picking up a predetermined number of cherries from said hopper and for discharging the same at said point of discharge, and means for rotating said reel.

4. An apparatus for orienting and feeding fruit to an intermittently movable fruit support comprising a hopper for receiving a promiscuous mass of fruit, a reel rotatably mounted adjacent said hopper and having its periphery extending into the same, fruit receiving means pivotally mounted at segmental points adjacent the periphery of said reel, means for balancing the fruit receiving means in a predetermined position relative to the reel, means for rotating the reel to move the fruit receiving means through the hopper, cam means engageable by the balancing means for urging the fruit receiving means into fruit supporting position to pick up fruit from the hopper during movement therethrough, said cam means having an undulated portion for jarring excessive fruit from the fruit receiving means as they move through the hopper and a portion for turning said fruit receiving means into fruit discharging position at a point above said fruit support, and means for receiving the fruit discharged from the cup bars to turn the fruit for descent drupe end first into said fruit support.

5. In a fruit handling machine including an intermittently movable fruit supporting means, a feed mechanism comprising a hopper for receiving and supporting a promiscuous mass of fruit, a reel rotatably mounted adjacent said hopper and having a plurality of fruit receiving cups pivotally mounted at equidistant points along its rim portion for receiving a predetermined number of the fruit from said hopper and for conveying said fruit to a point above said intermittently movable fruit supporting means, means for rotating said reel in timed relation with the movement of said intermittently movable fruit supporting means, means associated with said fruit receiving cups for balancing the latter relative to said reel, cam means for positioning said cups pocket side up as they travel through said hopper to receive fruit therefrom, said cam means having an undulated portion for shaking said cups as they leave the hopper to jar excess fruit from said cups and a cam portion for tipping said cups into fruit discharging position at said point above said intermittently movable fruit supporting means, and orienting means between said intermittently movable fruit supporting means and said reel for directing the fruit discharged from the latter into said fruit supporting means.

6. In a feed mechanism for a fruit handling machine including a conveyor having a plurality of fruit holding means and means for intermittently moving the conveyor to dispose said fruit holding means at predetermined indexed positions, the combination of a hopper arranged adjacent said conveyor for receiving and supporting a promiscuous mass of fruit thereabove, a feed reel rotatably mounted adjacent said hopper to receive fruit therefrom for transmittal to a point above said fruit holding means, a plurality of fruit receiving cups pivotally arranged at segmental points adjacent the periphery of said reel and capable of receiving a single fruit from said hopper, means for balancing said cups in a predetermined position as the reel is rotated, cam means on said housing and engageable by said balancing means for positioning the cups in fruit supporting position as they travel through said hopper and for swinging the cups into fruit discharging position when they arrive at a point above said conveyor, and means for receiving the fruit discharged from the fruit receiving pocket for guidance into said fruit holding means, stem end up.

7. An apparatus for orienting and feeding fruit to an intermittently movable fruit support comprising a hopper for receiving a promiscuous mass of fruit, a reel rotatably mounted adjacent said hopper, and having its periphery extending into the same, fruit receiving means pivotally mounted at equally spaced points along the periphery of the reel, means for rotating the reel to move the fruit receiving means through the hopper, a cam for engaging said fruit receiving means for urging the latter into fruit supporting position to pick up fruit from the hopper during its travel through the same, said cam having an undulated portion for jarring excessive fruit from the fruit receiving means as they travel through said hopper and a portion for turning the fruit receiving means into fruit discharging position at a point above the fruit support, and means between said reel and said intermittently movable fruit supporting means for orienting the fruit and for directing the same stem end up into the latter.

8. In fruit handling machines including an intermittently movable turret having fruit supporting means arranged in groups to receive stem bearing fruit at one of its indexed positions, the combination of a feeding and orienting means comprising a hopper arranged adjacent said turret at said indexed position for receiving and supporting a promiscuous mass of fruit, a reel rotatably mounted adjacent said hopper and having its periphery extending into the hopper, a plurality of cups pivotally mounted on said reel and having fruit receiving pockets each capable of holding a single fruit, means for balancing said cups relative to the reel, means for rotating said reel to move said cups through said hopper to pick up fruit for transfer to a point above the turret, cam means engageable by said balancing means for holding said cups in fruit supporting position and for discharging the fruit from said pockets at said point above the turret, orienting means arranged between said point of discharge and said fruit supporting means, said orienting means comprising a stem guide engageable by the stem of a falling fruit whereby to turn the latter into a rightened condition for descent fruit end first, and a feed cone arranged below said stem guide to receive fruit therefrom and for maintaining said fruit in rightened condition while directing the fruit into said fruit supporting means.

9. In an orienting device for a fruit handling machine having an intermittently movable fruit support adapted to receive stem bearing fruit for transfer in oriented condition, a gravity feed chute comprising a stem guide for engaging the stem of a falling fruit to right the latter in the course of its descent, a feed cone having a front half and a rear half divided along a vertical plane extended up from the path of movement of the fruit support, means mounting said front and rear halves of said cone at their upper ends for movement relative to each other, means for swinging said halves toward and away from each other to open the cone when said fruit support is moved and to close the same when said fruit support is at rest, a gate pivotally mounted between the feed cone and the stem guide and cooperating with the latter to normally intercept descent of the fruit toward said feed cone when the latter is open, and means on one of said halves and engageable with said gate to release intercepted fruit therefrom simultaneous with the closing of said halves.

10. In a feed mechanism for a fruit handling machine including a plurality of fruit holding means and means for intermittently moving said fruit holding means into an indexed position the combination of a housing arranged adjacent said indexed position, a hopper carried by said housing for receiving a promiscuous mass of fruit, a feed reel rotatably mounted on said housing to receive fruit from the hopper for conveying said fruit to a point above said holding means and comprising a plurality of cup bars pivotally arranged at segmental points along the periphery of said reel, each of said cup bars having a plurality of fruit receiving pockets each capable of receiving a single fruit from said hopper as they travel therethrough, a weighted arm associated with each cup bar for normally balancing the same in a predetermined position as the reel is rotated, cam means on said housing and engageable by said weighted arms for holding said cup bars in fruit supporting position as they travel from said hopper to said point above said holding means and for swinging the latter and said cup bars into fruit discharging position when they arrive above said fruit holding means, a gravity chute arranged to receive the fruit discharged from the cup bars and comprising a stem guide engageable by the stem of a falling fruit to deflect the fruit into a position with its meat end foremost, and a feed cone for receiving the positioned fruit from said stem guide and for discharging the fruit into said supporting means meat end foremost.

11. A feeding and orienting apparatus for fruit handling machines having an intermittently movable fruit holding means for receiving fruit stem up comprising a plurality of gravity chutes, means for periodically feeding fruit into each of said chutes, said chutes comprising semi-tubular stem guides having flared entrances and arcuate contiguous walls for deflecting laterally extending stems of falling fruit into axial alignment with their respective chutes and a plurality of normally closed split feed cones for depositing the fruit in their respective fruit holding means while maintaining the stems of such fruit in axial alignment therewith, said stem guide having an inclined lower end, a gate pivotally mounted relative to said stem guide and normally urged into engagement with the lower ends of said contiguous walls to form an open bottomed trough below the stem guide for intercepting the fruit and for guiding the stems of fruit falling stem end first into fulcrumed engagement with the upper edge of the feed cone whereby the fruit will swing by the weight of its drupe portion for gravitation through said feed cone stem end up when released by the gate, said feed cones being split vertically substantially along the path of travel of said fruit holding means, means for opening the feed cones to permit movement of said holding means without disturbing the upstanding stems of the fruit therein, and means operable with the feed cones for swinging the gate out of fruit intercepting position to release the fruit when said cones are closed.

12. A feeding and orienting apparatus for fruit handling machines having an intermittently movable fruit holding means for receiving fruit stem end up comprising a hopper for receiving a promiscuous mass of stem bearing fruit, a plurality of fruit receiving pockets for picking up a predetermined number of fruit, means for supporting said fruit receiving pockets for independent rotation and for moving them in succession from the hopper to a point above said fruit holding means, cam means for holding said fruit receiving pockets in fruit supporting position as they move from said hopper and for agitating them in the course of their movement to shake excess fruit back into the hopper, said cam having a portion thereon for inverting said fruit receiving pockets to discharge fruit therefrom at said point above said fruit holding means, a plurality of gravity chutes each arranged to receive an individual fruit discharged from said fruit receiving pockets and comprising semi-tubular stem guides having widened entries and arcuate contiguous walls for deflecting laterally extending stems of falling fruit into axial alignment with their respective chutes and a plurality of normally closed split feed cones for depositing the fruit in their respective holding means while maintaining the stems of the fruit in axial alignment therewith, said stem guide having the bottom of said contiguous walls angularly disposed, a pivotally mounted gate normally urged into engagement with the converging ends of said contiguous walls and the bottom thereof to form an open bottomed trough for intercepting the fall of the fruit and for guiding the stems of fruit falling stem end first into fulcrumed engagement with the upper edge of the feed cone whereby the fruit will swing by the weight of its drupe portion for gravitation through said feed cone stem end up when released from said gate, said feed cones being split along a vertical plane above the line of travel of said intermittently movable fruit holding means, means for opening the feed cones to permit movement of said holding means without disturbing the upstanding stems of the fruit therein, and means operable with the feed cones for swinging the gate out of fruit intercepting position to release the fruit when said cones are closed.

13. In a feed mechanism for fruit handling machines including a conveyor having a plurality of groups of fruit supporting means and means for intermittently moving the conveyor to position said groups of supporting means at predetermined indexed positions, a hopper arranged adjacent the conveyor at one of said indexed positions for supporting a promiscuous mass of fruit, a feed reel rotatably mounted adjacent the hopper and comprising a plurality of fruit receiving means pivotally arranged at segmental points along the periphery of said reel and each having a plurality of fruit receiving pockets corresponding in number to the number of fruit supporting means in one group thereof and each capable of receiving a single fruit from the hopper, means for balancing said fruit receiving means in fruit supporting position relative to the reel as it is rotated, means for swinging said fruit receiving means into fruit discharging position when they arrive at a point above the conveyor, means operatively associated with the conveyor moving means for rotating the reel in timed relation therewith to move one fruit receiving means into fruit discharging position upon each intermittent movement of said conveyor, a plurality of gravity chutes aligned with said plurality of fruit receiving pockets to receive falling fruit therefrom and for directing said fruit toward the fruit supporting means, and chutes comprising a stem guide engageable by the stem of a falling fruit to turn the fruit into a rightened position with its meat end foremost and a plurality of split feed cones normally urged into closed condition to direct the rightened fruit into the fruit supporting means, means operatively associated with the conveyor moving means for opening the split cones during intermittent movement of the conveyor to permit movement of the fruit supporting means with the stems of the fruit extending upwardly therefrom, a normally closed gate arranged between the stem guard and the feed cones for obstructing the fall of fruit into the latter, and means on the feed cones and engageable with the gate for opening the latter to release the fruit held thereby when said cones are urged toward closed condition.

WALTER W. KELLY.

REFERENCES CITED

The following references are of record in the file of this patent:

UNITED STATES PATENTS

| Number | Name | Date |
|---|---|---|
| 1,190,721 | Campbell | July 11, 1916 |
| 1,350,154 | Hamilton | Aug. 17, 1920 |
| 1,776,856 | Horton | Sept. 30, 1930 |